(12) United States Patent
Weiss

(10) Patent No.: US 10,620,058 B2
(45) Date of Patent: Apr. 14, 2020

(54) VARIABLE ANGLE GLASS THERMOMETER

(71) Applicant: Weiss Instruments Inc., Holtsville, NY (US)

(72) Inventor: John William Weiss, Oakdale, NY (US)

(73) Assignee: WEISS INSTRUMENTS LLC, Holtsville, NY (US)

( * ) Notice: Subject to any disclaimer, the term of this patent is extended or adjusted under 35 U.S.C. 154(b) by 236 days.

(21) Appl. No.: 15/850,275

(22) Filed: Dec. 21, 2017

(65) Prior Publication Data
US 2019/0195698 A1  Jun. 27, 2019

(51) Int. Cl.
*G01K 5/08* (2006.01)
*G01K 5/10* (2006.01)

(52) U.S. Cl.
CPC ............... *G01K 5/08* (2013.01); *G01K 5/10* qj(2013.01)

(58) Field of Classification Search
CPC .................. G01K 5/08; G01N 33/386
USPC .................. 374/100, 187, 190, 208; 116/216
See application file for complete search history.

(56) References Cited

U.S. PATENT DOCUMENTS

| | | | | |
|---|---|---|---|---|
| 1,970,715 A * | 8/1934 | Tate | ............... | G01K 5/025 374/190 |
| 2,160,404 A * | 5/1939 | Hurlburt | ............... | G01K 5/16 337/321 |
| 2,415,309 A * | 2/1947 | Stone | ............... | G01K 5/08 374/190 |
| 2,524,894 A * | 10/1950 | Dobrin | ............... | G01K 1/14 374/194 |
| 2,875,614 A | 3/1959 | Dobrin et al. | | |
| 3,074,275 A * | 1/1963 | Hobin | ............... | G01K 5/025 374/190 |
| 4,968,153 A * | 11/1990 | Stachoviak | ............... | G01K 1/14 374/109 |

FOREIGN PATENT DOCUMENTS

CN            91225884 U  *  9/1991

* cited by examiner

*Primary Examiner* — Gail Kaplan Verbitsky
(74) *Attorney, Agent, or Firm* — Robert P. Michal, Esq.; Carter, DeLuca & Farrell LLP

(57) ABSTRACT

A liquid in glass variable angle thermometer tube includes a bulb containing a volume of liquid with a known coefficient of thermal expansion and having a sensing portion for sensing temperature, a glass capillary column for reading the height of the liquid therein, and a flexible metal capillary connecting the sensing portion to the glass capillary column. The flexible metal capillary is in fluid communication with the sensing portion and the glass capillary column such that the liquid in the bulb is permitted to transfer from the sensing portion to the glass capillary column. The bulb is connected directly to the flexible metal capillary and includes an extension portion that is separate from the volume of liquid and the extension portion supports the bulb remote to the temperature sensing volume.

6 Claims, 3 Drawing Sheets

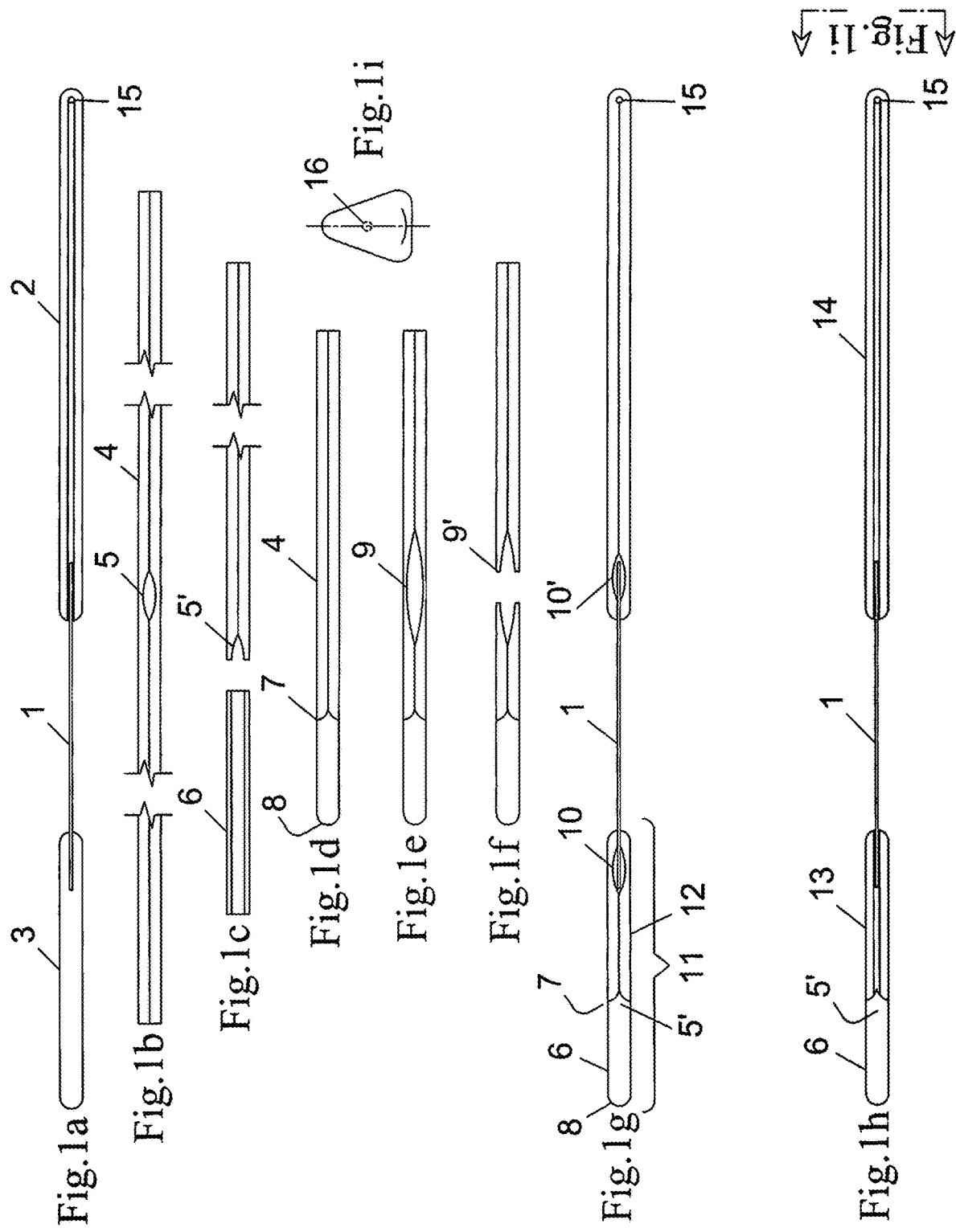

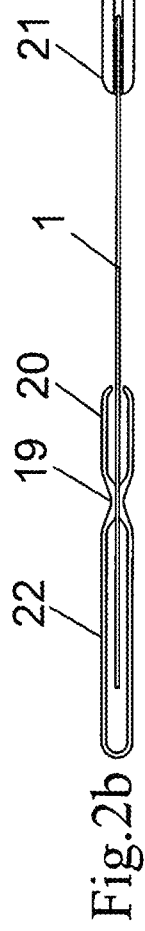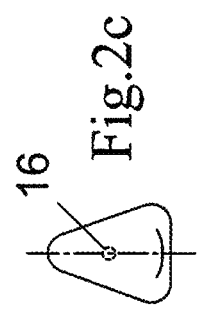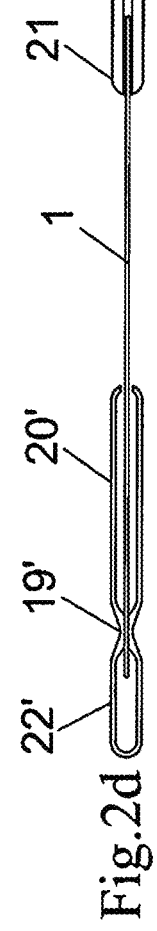

VARIABLE ANGLE GLASS THERMOMETER

BACKGROUND

Technical Field

The present disclosure relates to an apparatus for measuring temperature, and more particularly, to an adjustable angle glass thermometer tube and method of manufacturing the same.

Background of Related Art

Since the invention of the mercury in glass thermometer by Daniel Gabriel Fahrenheit in 1714, few improvements have had significance in the market as much as the development of the adjustable or variable angle glass thermometer tube. The variable angle thermometer tube typically incorporates a thin metal alloy capillary that attaches the bulb, sensing portion, to the column, reading portion. In this configuration, the stem can be at any angle to the column. Industrial thermometers used in pipe line applications before 1950 were typically constructed in a fixed form to best align the reading portion with the pipe fitting that the stem is attached to. The fixed forms included straight form, back angle, right angle, left angle, incline 45 degree angle, both right and left and oblique angle, or 45 degrees toward the back. By 1970, most industrial thermometers were of the variable form reducing the need to specify the form and reducing the number of thermometer types for a distributor to stock.

On Oct. 10, 1950, in U.S. Pat. No. 2,524,894, E. P. Dobrin presented a thermometer that had a globe like adjustable ball and socket that housed a thermometer tube having a capillary that attached a bulb to a glass stem or column mounted over a scale. The disclosure provides little information about the connections of the metal capillary to the bulb and in particular, FIG. 2 of Dobrin's patent shows the capillary entering the bulb in a position that is within the fitting. As can be appreciated, this would compromise accuracy since a portion of the volume is located outside of the chamber used for temperature sensing. In a later patent, U.S. Pat. No. 2,875,614, Dobrin shows an elongated neck on the bulb packed with asbestos to secure in the bulb chamber.

U.S. Pat. No. 3,079,798, granted to Philip, Albert and William Weiss, presents a compact adjustable joint. FIG. 2 of the Weiss patent shows the capillary connected to both the upper glass capillary column, used to read the column height against a scale, and the tubular stem portion. Again the connection shown in the Weiss patent is well outside of the sensing bulb chamber 2.

In a later patent, U.S. Pat. No. 3,487,689, P. J. Weiss shows the glass bulb attached to the stem with a support. The sensing bulb is shown in its entirety with the upper end well outside of the sensing section. In these patents the sensing part of the glass bulb is shown to be outside of the bulb chamber, but in actuality the thermometer tubes that were produced were not outside of the sensing section. Rather, a glass portion that is similar to the column glass is attached to the bulb so that all of the volume is within the sensing portion and support is made to that glass section that has very little volume.

In the U.S. Pat. No. 3,487,689 patent, P. J. Weiss mentions the sensing means, a liquid, may be mercury or alcohol. The industry standard at the time was mercury. The bore in the column glass for mercury filled glass thermometers is very small and included a lens shape to expand the size of the bore for easy reading. The industry standard at the time was also specified as red reading mercury which included a red stripe in the glass and a thin parabolic bore to reflect the stripe off the mercury so that the mercury column appeared to be red for easier reading. Due to health and environmental concerns, mercury has been replaced with organic liquids, in some cases non-toxic and environmentally friendly liquids, that are died blue or green to distinguish the non-mercury thermometer from red reading mercury.

SUMMARY

In accordance with an embodiment of the present disclosure, a liquid in glass variable angle thermometer tube is provided including a bulb containing a volume of liquid with a known thermal coefficient of thermal expansion and having a sensing portion for sensing temperature. The liquid in glass variable angle thermometer further includes a glass capillary column for reading the height of the liquid therein and a flexible metal capillary that connects the sensing portion to the glass capillary column. The flexible metal capillary is in fluid communication with the sensing portion and the glass capillary column such that the liquid in the bulb is permitted to transfer from the sensing portion to the glass capillary column. The bulb is connected directly to the flexible metal capillary and includes an extension portion that is separate from the volume of liquid. The extension portion supports the bulb remotely to the temperature sensing volume.

In aspects, the metal capillary may be thin and flexible.

In other aspects, the liquid in glass variable angle glass thermometer may include a glass bulb tubing that is closed on one end.

In certain aspects, the glass bulb tubing may be sealed to the flexible metal capillary along the length thereof to separate the sensing portion of the bulb from the extension portion.

In other aspects, the extension portion may include a smooth, partially closed open end.

In accordance with another embodiment of the present disclosure, a liquid in glass variable angle thermometer tube for a variety of temperature ranges is provided and includes a glass bulb having an active sealed portion which has a sealed volume of liquid and an inactive portion for providing support to the active sealed portion. The liquid in glass variable angle thermometer tube further includes a glass capillary column for reading the height of the volume of liquid therein, a metal capillary sealed to both the active portion of the glass bulb and the glass capillary column, and a glass to metal seal in the glass bulb that is configured to control the volume of liquid in the glass bulb.

BRIEF DESCRIPTION OF THE DRAWINGS

Various embodiments and methods of construction of the present disclosure are described herein below with reference to the drawings, wherein:

FIG. 1a is a front view of a prior art variable angle thermometer tube having direct connection of a capillary to a bulb and column thereof;

FIG. 1b is a front view of a first stage of construction of a second prior art variable angle thermometer tube where a small blister is blown in the lens glass capillary;

FIG. 1c is a front view of a second stage of construction of the second prior art variable angle thermometer tube of FIG. 1b shown with the small blister parted and readies to attach a glass tubing to form a bulb therein;

FIG. 1d is a front view of a third stage of construction of the second prior art variable angle thermometer tube of FIG. 1b shown with the tubing closed and welded to the capillary lens glass to form a closed bulb;

FIG. 1e is a front view of a fourth stage of construction of the second prior art variable angle thermometer tube of FIG. 1b shown with a long blister is blown in the lens glass section to expand the bore;

FIG. 1f is a front view of a fifth stage of construction of the second prior art variable angle thermometer tube of FIG. 1b shown with the long blister parted;

FIG. 1g is a front view of a sixth stage of construction of the second prior art variable angle thermometer tube of FIG. 1b shown with the metal capillary sealed to both the stem and column;

FIG. 1h is a front view of a third prior art variable angle thermometer tube shown with the metal capillary tubing directly inserted and sealed to both the stem and column;

FIG. 1i is a cross-sectional view of a lens glass of the variable angle thermometer tube of FIG. 1h showing a large circular bore;

FIG. 2a is a front view of a first stage of assembly of a variable angle glass thermometer tube provided in accordance with the present disclosure;

FIG. 2b is a front view of another variable angle glass thermometer tube provided in accordance with the present disclosure constructed to have a wide temperature range;

FIG. 2c is a cross-sectional view of a column lens glass of the variable angle glass thermometer tube of FIG. 2a, taken along section line 2c-2c of FIG. 2a;

FIG. 2d is a front view of yet another variable angle glass thermometer tube provided in accordance with the present disclosure constructed to have a narrow temperature range; and FIG. 3 is a cross-sectional view of a support for a stem portion of the variable angle glass thermometer tube of FIG. 2a.

DETAILED DESCRIPTION OF EMBODIMENTS

Figure 3:
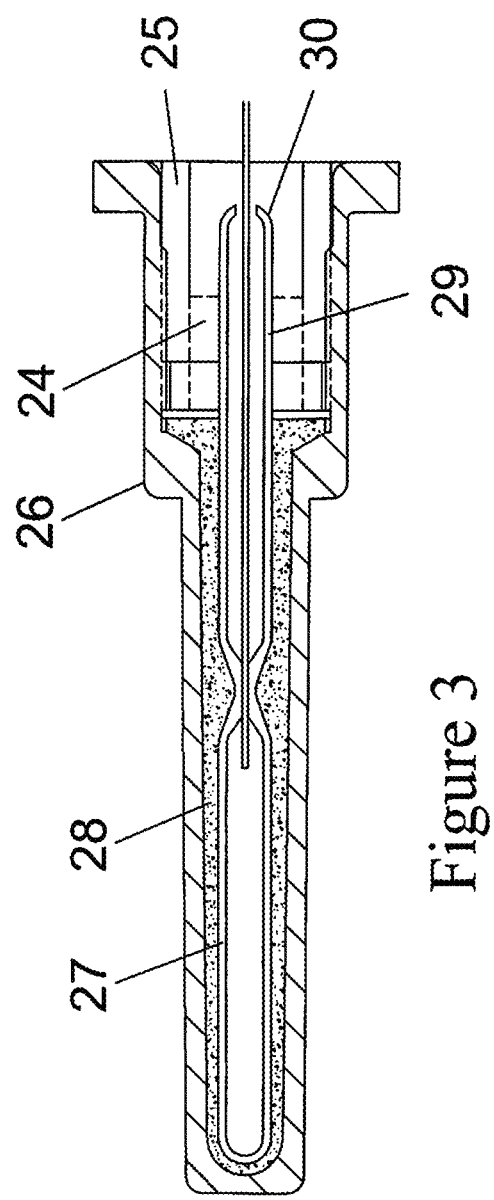

Embodiments of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. Further, the term blowing refers to the method of introducing air to near molten glass to cause a 'blown' cavity also referred to as a blister. In the following description, well-known functions or constructions are not described in detail to avoid obscuring the present disclosure in unnecessary detail, however methods of construction are described for both prior art and the present invention.

The use of mercury as the thermometric liquid in a liquid in glass thermometer is ideal because of the low expansion rate as compared to organic liquids. The bore size for mercury is thus small and the bulb is comparatively large. The ratio of the volume within the reading column and the bulb volume is small resulting in a low ambient error due to the temperature of the column. Organic liquid thermometers have a larger column bore compared to the comparable mercury thermometer.

Referring now to the drawings, FIG. 1a illustrates a variable angle thermometer tube as described in the prior art where, for purposes of illustration, the metal capillary tubing 1 is inserted into the bore 16 (FIG. 1i) of the column glass 2 and directly into the glass bulb 3. As can be appreciated, the details of how this was accomplished were not described in the prior art patents and in fact, the bore 16 of mercury in the column tubing glass 2 is an order of magnitude smaller than would allow insertion of the metal capillary tubing 1 and if the metal capillary tubing were attached directly to the glass bulb 3 it would present a problem to support the glass bulb 3 to keep it coincident with the metal bulb chamber (not shown here). Further, supporting the temperature sensing bulb of FIG. 1a (e.g., glass bulb 3) would affect the accuracy of the thermometer as heat would be permitted to transfer to the support (not shown). Supporting the glass bulb 3 is important to avoid the glass bulb 3 from touching the inside of the bulb chamber which may cause breakage of the glass bulb 3. When sealing the top of the tube, a common practice is to blow an expansion chamber 15 to accommodate the expansion of the liquid beyond the top of the range.

The prior art tubes were actually made according to the construction of FIG. 1b through 1g. In the first stage of construction, a small blister 5 is blown in the center of a lens glass capillary cane 4, scored, and split in the middle of the blister. Referring to FIG. 1c, this half blister section acts as a funnel 5' for attaching a glass tubing 6 to the lens glass 4 at a position 7 without closing the bore 16, as shown in FIG. 1d. The tubing 6 becomes the closed volume sensing bulb when closed at the bottom 8 of the glass tubing 5 and welded to the lens glass 4, as shown in FIG. 1d. In the next stage of construction, FIG. 1e, a long blister is then blown and is again parted. The long blister 9 allows the diameter of the bore 16 (FIG. 1i) to be large enough for the insertion of the metal capillary 1 into the enlarged bore 9' (Figure if). The glass in the section of the inserted metal capillary 1 is heated, in one non-limiting embodiment by flame, to close around the metal capillary 1 to form a metal to metal seal 10 and 10', as shown in FIG. 1g. The large blister 9 as described above remains as a residual cavity 10 and 10'. The portion of the lens glass capillary tubing 12 that remains on the bulb side 11 is not part of the active volume of the bulb 6 and can be used to support the bulb side glass 11 and glass bulb 6 to prevent the glass bulb 6 from hitting the inside of a protective metal bulb chamber, as will be described in further detail hereinbelow.

Since 2003, the industry standard is no longer Red Reading Mercury. The larger thermal expansion of the organic liquids requires a larger, round bore. The bore no longer has the cross-section crescent shape of a parabola to reflect red off the mercury column. Referring to FIG. 1h, the metal flexible capillary 1 can be inserted into the bore 16 (FIG. 1i) of the lens column glass 14 and the bulb lens glass 13 without enlarging the bore 16, as described above. This is most easily done for wide ranges where the bore 16 is large. In embodiments, the capillary 1 is generally 0.019" in diameter and is heat treated to reduce outgassing when the glass to metal seal is made, although other suitable diameters are also contemplated. Using this method, a tube in the form of FIG. 1h can be made where the errors introduced by the residual cavities 10 and 10' are reduced. A small blister 4 (FIG. 1b) is used to form the funnel shape 5' to attach the bulb tubing 6 without closing the bore 16. As can be appreciated, for narrow ranges, the use of a smaller diameter metal capillary to be inserted into a smaller bore is technically feasible. This metal flexible capillary is generally made of an alloy containing Nickel that has a low coefficient of thermal expansion similar to the coefficient of thermal expansion of the glass to reduce the stress incurred during temperature changes.

FIGS. 2a-2d illustrate a variable angle flexible thermometer tube in accordance with an embodiment of the present invention. FIG. 2a illustrates the assembly prior to sealing the glass to the metal capillary tubing 1. The metal capillary tubing 1 is inserted into a closed end glass ampule 17 on one end and into the bore 16 (FIG. 2c) of the thermometer lens glass 18 on the other end. By applying heat to the ampule at 19 and to the glass lens capillary at 21 a seal to the metal capillary 1 is made, FIG. 2b. As illustrated in FIG. 2b, with a large volume bulb 22, this configuration would be used for narrow temperature ranges. For a narrow temperature range, such as 0° to 120° F., a larger volume bulb 22 and a smaller diameter bore 16, as shown in FIG. 2c, may be used. In this construction, the bulb ampoule 17 is heated at a specific location 19 to neck down and weld to the metal capillary 1 controlling the length and volume of the glass bulb 22. External to the bulb volume is section 20 which supports the glass bulb 22 by the extension 20 to keep the active sealed glass bulb 22 on its center and avoid touching the metal protective bulb chamber shown in FIG. 3. FIG. 2c illustrates a variable angle flexible thermometer having a similar construction to the variable angle flexible thermometer tube of FIG. 2b when a wide temperature range, such as 30° to 240° F., is desired. The bulb glass to metal seal is made at location 19', which creates a smaller bulb volume 22' and a longer extension section 20'. Both bulb constructions of FIGS. 2b and 2c are of a same or similar overall length and may be supported in the bulb chamber described in FIG. 3 at a same or similar position.

Referring now to FIG. 3, a cross-section view of the stem and protective housing of the variable angle flexible thermometer tube of FIGS. 2b and 2c is illustrated. An upper portion of the extension 23 is supported and cushioned in a silicone rubber support bushing 24 that fits into a fitting 25 having external threads (not shown). During the glass thermometer production a separate heater or flame is used to round the open extension section 29 at a location 30 used for easy insertion into the silicone support bushing 24. A bulb chamber 26 threads onto the fitting 25 to protect the glass bulb 27. A material such as graphite 28 provides heat transfer between the metal bulb chamber 26 and the glass bulb 27. The active volume of the glass bulb 27 is well separated from the support bushing 24 and the fitting 25 has no temperature effect on the temperature of the active glass bulb 27.

It will be understood that various modifications may be made to the embodiments of the presently disclosed interbody spacer. Therefore, the above description should not be construed as limiting, but merely as exemplifications of embodiments. Those skilled in the art will envision other modifications within the scope and spirit of the present disclosure.

What is claimed is:

1. A liquid in glass variable angle thermometer tube, comprising:
   a glass bulb having opposite first and second ends and containing a volume of liquid with a known coefficient of thermal expansion, the glass bulb having a sensing portion for sensing temperature;
   a glass capillary column for reading the height of the liquid therein; and
   a flexible metal capillary connecting the sensing portion to the glass capillary column, the flexible metal capillary being in fluid communication with the sensing portion and the glass capillary column such that the liquid in the glass bulb is permitted to transfer from the sensing portion to the glass capillary column,
   wherein the glass bulb has a reduced-diameter section disposed between the opposite first and second ends of the glass bulb, the glass bulb being sealed to the flexible metal capillary at the reduced-diameter section.

2. The liquid in glass variable angle thermometer tube of claim 1, wherein the metal capillary is thin and flexible.

3. The liquid in glass variable angle thermometer tube of claim 1, wherein the second end of the glass bulb is closed.

4. The liquid in glass variable angle thermometer tube of claim 3, wherein the reduced-diameter section separates the glass bulb into the sensing portion and an extension portion.

5. The liquid in glass variable angle thermometer tube of claim 4, wherein the sensing portion has the second end, and the extension portion includes the first end, which is smooth and partially open.

6. A liquid in glass variable angle thermometer tube for a variety of temperature ranges, comprising:
   a glass bulb including an active sealed portion, the active sealed portion having a sealed volume of liquid, and an inactive extension portion for providing support to the active sealed portion, wherein the glass bulb has a reduced-diameter section disposed between the active sealed portion and the inactive extension portion;
   a glass capillary column for reading the height of a volume of liquid therein;
   a metal capillary sealed to both the active sealed portion of the glass bulb and the glass capillary column, wherein the glass bulb is sealed to the metal capillary at the reduced-diameter section.

* * * * *